United States Patent

Ganter et al.

[11] Patent Number: 5,430,693
[45] Date of Patent: Jul. 4, 1995

[54] RADIO-CONTROLLED TIMEPIECE

[75] Inventors: Wolfgang Ganter, Schramberg; Johannes Neudecker, Erlangen; Thomas Meier, Schramberg, all of Germany

[73] Assignee: Junghans Uhren GmbH, Schramberg, Germany

[21] Appl. No.: 321,445

[22] Filed: Oct. 12, 1994

[30] Foreign Application Priority Data

Oct. 14, 1993 [DE] Germany ............... 9315669 U

[51] Int. Cl.⁶ ............................................. G04C 11/02
[52] U.S. Cl. ............................................. 368/47; 368/10
[58] Field of Search ................... 368/10, 47, 48–61

[56] References Cited

U.S. PATENT DOCUMENTS

| 5,235,563 | 8/1993 | Ganter | 368/43 |
| 5,253,226 | 10/1993 | Ganter | 368/43 |

FOREIGN PATENT DOCUMENTS

| 0531853 | 3/1993 | European Pat. Off. |
| 0382130 | 4/1994 | European Pat. Off. |

Primary Examiner—Bernard Roskoski
Attorney, Agent, or Firm—Burns, Doane, Swecker & Mathis

[57] ABSTRACT

A radio-controlled timepiece comprises an antenna in the form of a core on which a coil is mounted. The core includes a hole spaced from the coil and defining an axis oriented perpendicular to the coil axis. A printed circuit board is disposed in the hole such that electrically conductive tracks thereof are arranged in a plane lying within a center plane of the core.

17 Claims, 1 Drawing Sheet

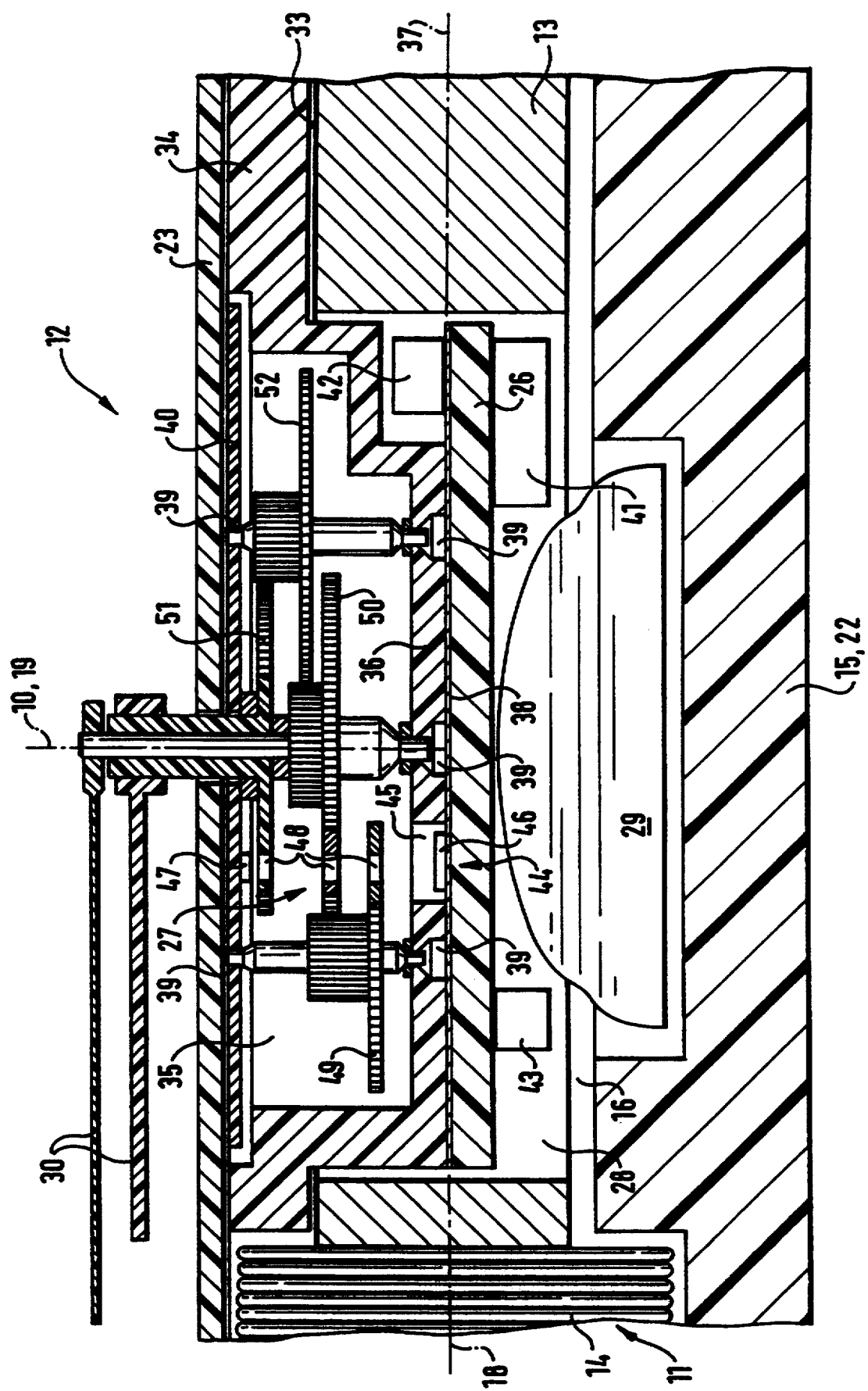

RADIO-CONTROLLED TIMEPIECE

BACKGROUND OF THE INVENTION

The invention concerns a radio-controlled timepiece which receives radio signals for correcting, if necessary, the time display (e.g., the indicating hands).

A radio-controlled timepiece of that kind is known from European Patent No. 0 531 853, wherein an electromagnetic antenna has a core that carries a coil. The coil operates a receiver for receiving external radio signals which correct the position of the time indicating hands if the position thereof does not correspond to the correct time represented by the radio signal. The core acts as a carrier for circuitry and display components. In the interests of providing for a compact structure, in particular in the form of a radio-controlled wristwatch, a thin disc-shaped core of the magnetic long-wave antenna itself (which is separate from the core portion which functions as the coil carrier), serves so-to-speak as a mechanism plate. Mounted thereon and, as far as may be necessary extending into same, is the mechanism comprising gears and hands, including the electromotor stepping drive thereof, as well as the electronic circuits for autonomous timepiece operation and for items of display correction information which are obtained fran received and decoded time signals. Also fitted into the shallow thin core is a receiving region for an electro-optical digital display. In order to reduce the machining expenditure on the ferrite core, miniaturized precision moldings of plastic material can be fitted into the core, for the gear mechanism bearing means.

A problem which arises with such a design is the proximity on the one hand of the electronic evaluation circuit and on the other hand the electromechanical hands drive in relation to the magnetic long-wave antenna in the form of the core with its antenna coil, since electromagnetic disturbances originating from the electronic and electromechanical circuits can be fed back in augmented form by way of the antenna action. Therefore, to provide an interference-free mode of operation, the endeavor is to operate a timepiece of that construction with an increased reception field strength, which however limits the area of use in terms of the distance from the time signal transmitter. Particularly critical are electrical interference phenomena which are due to operation of the voltage transformer circuit for the actuation of an LCD-display because the clock for the voltage transformer, which is derived from the frequency divider of the autonomous time-keeping circuit of the timepiece, with a strong harmonic, lies typically in the immediate vicinity of the transmission frequency of 77.5 kHz of the German time transmitter DCF77. As a result, the reception signal can be so heavily overlaid that the information in the received time signal can no longer be evaluated at all. However the clock-controlled currents in the processor for controlling the timepiece functions also give rise to alternating magnetic fields which cause heavy interference. The installation of electromagnetic shielding boxes between the antenna and the interference-radiating mans mounted on the antenna core would not only be very expensive from a production point of view but would also result in severe damping of the antenna so that the minimum field strength at the place of reception, required for interference-free operation of the timepiece, would further increase.

In consideration of those factors the object of the invention is so to design a radio-controlled timepiece of the general kind set forth that, without major additional structural expenditure and without the antenna effectiveness being unreasonably impaired, effective suppression of the electromagnetic interference influences from operating components which operate in the immediate vicinity of the antenna core itself is guaranteed.

SUMMARY OF THE INVENTION

In accordance with the invention, the antenna core has a hole formed therein which is spaced from the antenna coil and defines an axis extending transversely of the coil axis. A printed circuit board is disposed in the hole such that electrically conductive tracks thereof are arranged in a plane lying substantially within a center plane of the core.

In accordance with the invention the core of the magnetic long-wave antenna itself still serves as a carrier for the electronic and electromechanical functional parts of the timepiece, but the substantial disturbance sources are so embraced thereby that their interference influence on the antenna coil substantially geometrically (vectorially) cancel-out one another. In principle, the core which encloses the mechanism and which is covered by the dial or face of the timepiece can constitute the timepiece casing itself. However, it is more appropriate for the core, together with the hands-operating mechanism, to be encased in a surrounding casing of electrically non-conductive and magnetically non-screening material.

The invention also relates to a method of operating a radio-controlled timepiece.

BRIEF DESCRIPTION OF THE DRAWING

The sole figure of the drawing is a broken-away view in longitudinal section through a mechanism which is fitted into the antenna core.

DETAILED DESCRIPTION OF A PREFERRED EMBODIMENT OF THE INVENTION

Depicted in the Figure is a portion of a radio-controlled timepiece (preferably a wristwatch) having a magnetic long-wave antenna 11. The antenna, which is capacitively tuned to resonance, comprises a large-volume thin ferrite core 13 with antenna coil 14. In the interests of affording a high level of antenna sensitivity as a result of having a large core volume, the disc-shaped core 13 substantially fills the interior 16 of a plastic timepiece casing 15 which is in the form of a shallow cup, such a relationship being disclosed in Ganter U.S. Pat. No. 5,253,226, the disclosure of which being incorporated herein by reference. A reduced-thickness portion of the core 13, which is eccentric with respect to a vertical axis 10 of the core 13, serves as a carrier body for the coil 14. The coil axis 18 of the coil faces towards a mechanism axis 19 which extends transversely with respect thereto and coincides with the axis 10.

A region of a flat surface 33 of the core 13, which region is remote from the casing bottom 22, serves as a support for a flange 34 of a cup shaped member which is covered by a timepiece dial or face 23. The flange 34 surrounds the recess 35 of the cup-shaped member which is injection molded from plastic material and whose bottom 36 projects into a central hole 28 in the core 13, to such a degree as to extend into the region of a central plane 37 of the core 13. Fixed beneath the cup bottom 36 is a printed circuit board 26 for at least the most important components of the electronic circuits for autonomous time-keeping operation of the radio-controlled time-piece 12, i.e., for reception and decoding of the items of absolute time information, and for checking and, if necessary, correcting the instantaneous time display on the basis of the received current time information. In that respect the rear (upper) side of the printed circuit board 26, which side is substantially unoccupied but lined with wiring conductor tracks 38, is flat and lies under the cup bottom 36 which has a stepped configuration 36a to make room for components (e.g., a receiver 42) carried on the lined upper side of the circuit board. At any event, in that way the core 13 surrounds the boundary of the printed circuit board 26 and its components. The gears and hands mechanism 27 together with an electromechanical stepping motor (not shown) for moving the hands 30 is arranged in the interior 35 of the cup, shaped member, with bearing locations 39 for pivot bearings being disposed in the bottom 36 and in a bridge member 40 which spans over the opening of the cup configuration, under the face or dial 23.

A battery 29 extends into a through hole 28 of the core 13 which is concentric with respect to the mechanism axis 19, and is supported on the casing bottom 22.

The currents flowing through the conductor tracks 38 to the components of the circuit may give rise to such strong electromagnetic interference phenomena, in terms of the function of the antenna 11, that in themselves they require effective and therefore electrically good conductive and highly permeable screening measures. With the integral design configuration, the coupled-in interference phenomena can no longer be eliminated by maintaining a minimum structural distance between the printed circuit board 26 and the antenna 11, as was otherwise possible. It will be noted however that the geometrical design configuration and installation of screening covers are highly expensive. Also, the damping action of additional screening measures directly on the magnetic antenna 11 has the result that the antenna 11 becomes less sensitive, and thus proper reception operation can only be guaranteed when the reception field strength is higher, that is to say for example under better reception conditions when closer to the transmitter.

The electromagnetic fields of the currents which flow through the conductor tracks 38 of the (main) printed circuit board 26 and in the electrical components arranged thereon, in particular in the processor 41 for decoding the time signals and for checking and correcting the current tire display, contribute quite considerably to the interference phenomena picked up by the antenna 11. It has been found however that those interference influences are rendered very extensively ineffective if (a) the plane of those conductor tracks 38 is disposed approximately in the central plane 37 of the disc-shaped core 13, with which preferably also the coil axis 18 coincides, and (b) if the interference-active components which are disposed within the core 13 are arranged on the printed circuit board 26 as far as possible away from the coil 14, that is to say in the diametric oppositely disposed region of the through hole 28 in the core 13, which hole 28 accommodates the printed circuit board 26 and the mechanism 27. Due to feature (a) above, i.e., the centering of the interference sources in the coil axis, interference field components of approximately the same magnitude pass through the coil 14 in opposite directions by way of the core 13. Due to feature (b) above, i.e., the eccentric arrangement of the interference-active components in the hole 28, only a part of the magnetic fields which are therefore produced also extends through the oppositely disposed edge region of the hole 28 and thus through the adjacent region of the coil 14.

If a concentrated interference source, in particular in the form of a component with clock-controlled internal current flows, can also be arranged in the plane of symmetry of the coil 14, therefore in centered relationship with the coil axis 18 thereof, the interference influence is further reduced because the magnetic field components extend approximately transversely to the coil axis and therefore practically pass through no turns area. It will be noted, however, that arranging such a component as the processor 41 in a through opening in the printed circuit board 26 symmetrically relative to the coil axis 18 and thus relative to the plane of the conductor tracks 38 would give rise to problems in regard to connection arrangements. Instead it is more desirable for a further active component which in itself causes interference by way of its internal currents, such as the integrated receiver 42, to be arranged on the printed circuit board 26 approximately opposite to the processor 41 so that this then results in an approximately symmetrical position in relation to the coil axis 18, for the combination of the two interference sources 41/42. In contrast, concentrated passive components 43 such as for example processor and receiver circuit arrangements can be carried by the printed circuit board 26 more closely adjacent to the coil 14.

The strongest interference source in an electromechanically driven timepiece 12 is of course the field coil of the stepping motor. The stator thereof would therefore desirably be arranged as far away as possible from the coil 14, but in the plane of the coil axis 18. For reasons of space however that cannot be achieved in the case of a radio-controlled timepiece 12 which is for example in the form of a wristwatch and which is of very small diameter, especially as the design configuration must also ensure a transmission connection to the gear mechanism 27. Therefore, as a compromise, the stepping motor is arranged laterally beside the mechanism 27 in the interior 35 of the cup configuration of electrically and magnetically non-conductive material. Admittedly that asymmetrical position in relation to the antenna axis 18-37 no longer involves geometrical compensation of the interference fields which act from the motor on the coil 14. If however the radio-controlled timepiece 12 is only equipped with minutes and hours hands 30, there only needs to be one stepping actuation of the mechanism 27 from the motor per minute, and in the remaining 59 seconds in a minute the motor can be electrically switched off. Therefore, by way of the processor 41 which also controls operation of the motor, the receiver 42 is stopped for the period of time of operation of the motor, and the reception mode is therefore restricted to the sufficiently long pause time in operation of the motor and in that way the interference influence produced by the stepping motor is admittedly not geometrically compensated but it is equally effectively electrically blanked out.

An additional printed circuit board can be arranged on the face of the gear mechanism bridge member 40 which faces the dial 23 for mechanically holding and electrically actuating the stepping motor. That additional printed circuit board is then admittedly also not disposed symmetrically in the core 13 or relative to the coil axis 18, but the interference effect of its currents is then in fact restricted for example to the period of operation of the motor, in which now the receiver 41 is switched off. Such a feature is disclosed in Ganter et al U.S. Pat. No. 5,235,563, the disclosure of which is incorporated by reference herein. Moreover that additional printed circuit board can carry signals which give rise only to a rare flow of current, such as for example keying switches which are disposed at the front edge of the printed circuit board (and which thus can be actuated through the timepiece casing).

The transmitter or receiver respectively of a fork-type light barrier arrangement 44 may also be disposed on the additional printed circuit board, which relative to the mechanism 27 is arranged opposite to the main printed circuit board 26 and parallel thereto. The element of the light barrier arrangement 44, which is complementary thereto, is disposed on the lined side of the main printed circuit board 26 and projects into an opening 45 in the cup bottom 36. If this involves the transmitting-receiving element 46 of a reflection-type light barrier arrangement 44, then a reflector 47 only needs to be provided at the bridge member 40. The light barrier arrangement 44 is transmissive when aperture holes 48 which are provided in the intermediate gear 49 (driven by the motor pinion), in the minutes gear 50 which is driven by the pinion of the intermediate gear 49, and in the hours gear 51 are coaxially aligned one beneath the other, with the arrangement involving a transmitting coupling between the gears 50 and 51 by way of the change gear 52 which is not involved with the light barrier arrangement 44. The holes 48 are aligned precisely when and only when the hands 30 are in a defined reference direction (preferably both aligned with the 12 o'clock mark). From that reference position, the processor 41 then monitors the rotary movement of the hands 30 into the display position which corresponds to the current time as verified by radio, as also described in greater detail in German Patent No. 35 10 861 for gear mechanisms of a different configuration (for example with two electrically coupled motors).

Thus, without additional mechanical shielding means which damp the effect of the antenna 11, there is provided an extremely compact structure for the radio-controlled timepiece 12 in which the mechanism 27 and the E-block (connected printed circuit board 26) are sunk into the center of the core 13 beside the antenna coil 14, with a geometrical arrangement of the circuit portions from which not just sporadically electromagnetic interference influences originate, in such a way that such interference influences very substantially compensate for each other in terms of their resulting passage through the coil 14.

If desired, the core 13 could be configured to form a casing of the timepiece whereby the separate part 15 could be eliminated. Such a feature is disclosed in European Document EP 0 382 130, the disclosure of which is incorporated herein by reference.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A radio-controlled timepiece comprising:

a time display;

an antenna for receiving radio signals indicating correct time; the antenna including a core and a coil mounted on the core the coil defining a first axis, the core including a hole disposed adjacent the coil and defining a second axis oriented transversely of the first axis, a first plane extending centrally through the core and oriented transversely of the second axis;

a receiver connected to the coil;

a processor connected to the receiver and the time display for making corrections in the time display in accordance with the radio signals; and a printed circuit board disposed in said hole and including electrically conductive tracks arranged in a second plane lying substantially within the first plane.

2. The radio-controlled timepiece according to the claim 1, wherein the first axis lies substantially in the second plane.

3. The radio controlled timepiece according to claim 2, further including electrical current-conducting components arranged directly opposite one another on opposite sides of the printed circuit board so that, considered in combination, the components are arranged substantially symmetrically with respect to the first axis for minimizing electromagnetic interference produced by the components.

4. The radio-controlled timepiece according to claim 1, further including electrical current-conducting components arranged directly opposite one another on opposite sides of the printed circuit board so that, considered in combination, the components are arranged substantially symmetrically with respect to the first axis for minimizing electromagnetic interference produced by the components.

5. The radio-controlled timepiece according to claim 1, further including an electrical current conducting component mounted on the printed circuit board at a location remote from the coil to minimize electromagnetic interference produced by the component.

6. The radio-controlled timepiece according to claim 1 further including a cup-shaped member disposed in said hole and formed of electrically and magnetically non-conductive material, said cup shaped member having an underside to which a side of the printed circuit board is mounted.

7. The radio-controlled timepiece according to claim 6, wherein the electrically conductive tracks are disposed on the side of the circuit board which is mounted to the underside of the cup-shaped member.

8. The radio controlled timepiece according to claim 1 further including a cup-shaped member disposed in the hole and formed of electrically and magnetically non-conductive material, the cup-shaped member including a flange lying on a surface of the core, a timepiece dial positioned such that the flange is disposed between the timepiece dial and the surface of the core.

9. The radio-controlled timepiece according to claim 1, further including a cup-shaped member disposed in the hole, the cup-shaped member including an underside to which the printed circuit board is mounted, the time display comprising hands, a clockworks mechanism for operating the hands being mounted in the cup-shaped member, and a bridge member extending across a top of the cup-shaped member above the clockworks mechanism.

10. The radio-controlled timepiece according to claim 1, including a member disposed in the hole for supporting the printed circuit board and having an opening therethrough, a clockworks mechanism disposed in the hole for operating the time display and including a plurality of gears each lying in a plane oriented parallel to the circuit board, each of the gears having a hole therethrough arranged to pass into alignment with the opening during gear rotation, a light barrier arrangement including a transmitter element and a receiving element, one of the elements mounted on the printed circuit board in alignment with the opening.

11. The radio-controlled timepiece according to claim 1, further including an additional circuit board arranged in spaced relationship to the first plane and carrying circuits operable only sporadically when the receiver is non-operative.

12. The radio-controlled timepiece according to claim 1, further including a casing formed of an electrically non-conductive and magnetically non-screening material, the core being disposed in the casing, and a timepiece dial overlying the core.

13. The radio-controlled timepiece according to claim 1, further including a plastic casing formed as a shallow cup, the core disposed in and substantially filling the casing interior.

14. The radio-controlled timepiece according to claim 1, further including a plastic casing, the core disposed in the casing and including a reduced thickness portion spaced from the second axis, the coil mounted on the reduced thickness portion.

15. The radio-controlled timepiece according to claim 1, wherein the core defines a casing of the timepiece.

16. The radio-controlled timepiece according to claim 1, wherein the timepiece comprises a wristwatch.

17. The radio-controlled timepiece according to claim 1, wherein the printed circuit board carries the receiver and processor.

* * * * *